(12) United States Patent
Riels et al.

(10) Patent No.: US 11,442,154 B2
(45) Date of Patent: Sep. 13, 2022

(54) PASSIVE SOLAR IDENTIFICATION SYSTEM FOR UNDERWATER LIFT BAGS AND FLAGS

(71) Applicants: Richard Preston Riels, Sedro Woolley, WA (US); Daniel Greenberg, Bellingham, WA (US)

(72) Inventors: Richard Preston Riels, Sedro Woolley, WA (US); Daniel Greenberg, Bellingham, WA (US)

( * ) Notice: Subject to any disclaimer, the term of this patent is extended or adjusted under 35 U.S.C. 154(b) by 270 days.

(21) Appl. No.: 17/013,590

(22) Filed: Sep. 5, 2020

(65) Prior Publication Data

US 2021/0072363 A1 Mar. 11, 2021

Related U.S. Application Data

(60) Provisional application No. 62/896,599, filed on Sep. 6, 2019.

(51) Int. Cl.
*G01S 7/52* (2006.01)
*G01S 7/524* (2006.01)
*G01S 7/527* (2006.01)

(52) U.S. Cl.
CPC ...... *G01S 7/52001* (2013.01); *G01S 7/52004* (2013.01); *G01S 7/524* (2013.01); *G01S 7/527* (2013.01); *G01S 2007/52014* (2013.01)

(58) Field of Classification Search
CPC .. G01S 7/52001; G01S 7/52004; G01S 7/524; G01S 7/527; G01S 2007/52014; G01S 15/74; B63C 7/26
See application file for complete search history.

(56) References Cited

U.S. PATENT DOCUMENTS

| | | | | |
|---|---|---|---|---|
| 3,021,504 A | * | 2/1962 | Toulis | G01N 29/02 181/402 |
| 5,168,477 A | * | 12/1992 | Schenato | G06K 7/02 367/87 |
| 5,315,095 A | * | 5/1994 | Marom | G06K 7/10792 359/24 |
| 5,532,973 A | * | 7/1996 | Zehner | G01S 7/52004 367/13 |
| 11,122,785 B2 | * | 9/2021 | Greenberg | H04B 11/00 |
| 2009/0249681 A1 | * | 10/2009 | Havens | A01K 69/06 43/100 |
| 2010/0186283 A1 | * | 7/2010 | Havens | A01K 69/06 43/101 |
| 2012/0188844 A1 | * | 7/2012 | Tiltman | G10K 11/205 367/2 |

(Continued)

FOREIGN PATENT DOCUMENTS

| | | | | | |
|---|---|---|---|---|---|
| CN | 101755695 A | * | 6/2010 | | |
| DE | 3442051 C2 | * | 6/1993 | | B63G 8/34 |

(Continued)

*Primary Examiner* — Daniel Pihulic
(74) *Attorney, Agent, or Firm* — Robert Brownstein

(57) ABSTRACT

The invention is a system that enables passive sonar identification of underwater items by making use of lift bags and/or flags, having distinctive sequences of bands of sonar-signal-reflecting materials, wherein the lift items are partially inflated so as to present a predictable orientation with respect to the floor of a body of water and its surface.

6 Claims, 3 Drawing Sheets

501

502

(56) References Cited

U.S. PATENT DOCUMENTS

| | | | | |
|---|---|---|---|---|
| 2013/0105243 A1* | 5/2013 | Tiltman | ................... | B63B 51/00 |
| | | | | 181/175 |
| 2014/0157649 A1* | 6/2014 | Havens | ..................... | G09F 3/02 |
| | | | | 43/4.5 |
| 2018/0329033 A1* | 11/2018 | Pratt | ......................... | E01F 9/30 |
| 2019/0110452 A1* | 4/2019 | Greenberg | ............. | H04B 11/00 |
| 2019/0301634 A1* | 10/2019 | Greenberg | .............. | F16K 31/46 |
| 2021/0072363 A1* | 3/2021 | Riels | ....................... | G01S 7/527 |

FOREIGN PATENT DOCUMENTS

| | | | | | |
|---|---|---|---|---|---|
| WO | WO-2007093002 A1 * | 8/2007 | | ............ | G01S 15/96 |
| WO | WO-2011012878 A2 * | 2/2011 | | ............ | G01S 7/537 |
| WO | WO-2016079475 A1 * | 5/2016 | | | |
| WO | WO-2021102396 A1 * | 5/2021 | | ............ | F03B 13/142 |

\* cited by examiner

PASSIVE SOLAR IDENTIFICATION SYSTEM FOR UNDERWATER LIFT BAGS AND FLAGS

TECHNICAL FIELD

This is a system for passive identification of underwater items using sonar.

BACKGROUND OF THE INVENTION

Underwater items tethered to floating buoys may have their tethers snagged by boat propellers leaving the items littering the floors of bodies of water. An alternative method making use of inflatable lift bags may avoid such snagging, however, without a floating buoy, there is no practical means for identifying items attached to lift bags, and lift-bag owners, until the bags are inflated and their payloads floated to the surface.

Where the sea floor has many such untethered items, deployed by multiple owners, it would be useful to be able to survey the sea floor, using sonar, and be able to quickly locate such items and associate them with their contents and owners.

BRIEF DESCRIPTION OF INVENTION

The invention herein disclosed and claimed is a system making use of lift bags and/or lift flags, partially inflated so as to point toward the surface, and affixed with sonar-signal-reflecting material arranged in such a way as to provide reliable and distinguishable sonar signatures that are then associated with items, contents and owners.

Items resting on the sea floor have no predictable orientation with regard to an incident sonar signal. Thus, other than determining that an item is on the sea floor, there is no reliable means for labeling the item in such a way that it produces repeatable sonar signatures.

However, if a lift item (e.g. lift bag or lift flag) is partially inflated, it will orient itself in such way as to essentially point toward the surface of the body of water in which it is immersed. With strips of sonar-signal-reflective material oriented in a specific way, there will be much less variation in the detected sonar reflection signal making the deriving of a distinct sonar signature both reliable and repeatable.

If the strips are affixed to the outside of the lift items such that they are essentially parallel to one another and to the sea floor, then a sonar signal will produce a reflection that is both predictable and identifiable. The resolution of the detected reflection signal and its characteristics are determined by how far away the sonar transducer is from the item being "pinged," and the relative widths of the strips and inter-strip spacing. Practical sized lift items can be affixed with strips that support accurate readings at distances of 200 feet or more. At closer distances, the resolution and accuracy increases commensurately.

BRIEF DESCRIPTIONS OF THE DRAWINGS

DETAILED DESCRIPTION OF THE INVENTION

Untethered items on a sea floor present less risk of loss due to snagging of tethers by ship propellers. However, without a tether and floating buoy, there is no practical way to determine location, content and ownership of such untethered items until they are refloated.

A lift bag or lift flag, hereinafter referred to as "lift items," are typically made of air- and water-tight material sewn together to produce an inflatable, water-proof container, which when inflated will provide sufficient buoyancy so as to float the lift item and any payload to which it is attached to the surface of a body of water. The lift item is, in essence, an air bladder, and when partially inflated, it creates a sonar target reference based on its different density relative to water. The lift item will point toward the surface and present a broad profile when viewed at an angle that is essentially parallel, or makes a small angle, with the floor of the body of water.

A partially inflated lift item can be inflated such that it remains on the floor of a body of water but points essentially toward the surface. A band of sonar-signal-reflecting material may be created by affixing two strips on either side of a lift item such that when pointing toward the surface, the strips form a band that surrounds the lift item and is oriented essentially parallel to the floor of a body of water.

Two or more such bands can be affixed, with spaces between them, to create a pattern of parallel bands with spaces between them when viewed from any side, assuming the lift item is partially inflated so as to point essentially to the surface.

Even where the partially inflated lift item has an ovoid rather than circular shape as viewed from directly above, the bands are essentially parallel with spaces between them regardless of sideways viewing angle. The only difference may be the viewed horizontal length of such bands.

A sonar signal that is incident upon this partially inflated lift item will have its reflected signal modulated by the bands of sonar-signal-reflecting material. As such, the number, widths and spaces between the bands can be sequenced so as to produce distinct, readily detected sonar signatures. These, in turn, can then be associated with the locations, contents and ownership of these lift items and their payloads. A lift item with no bands can serve as a null signature and could be used, for example, to adjust sonar sensitivity and resolution for greater accuracy.

Figure 1:
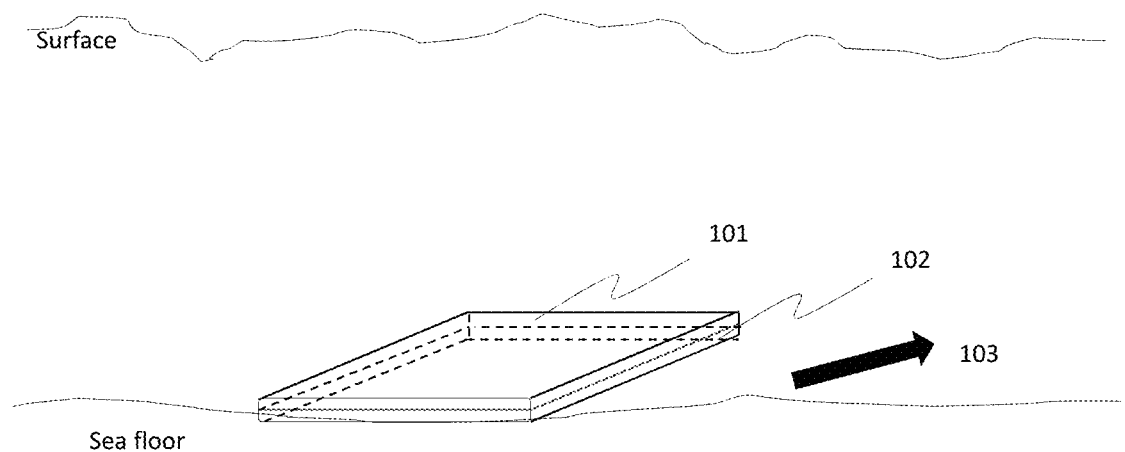
FIG. 1 depicts an exemplary lift item resting on the floor of a body of water.

In FIG. 1, a lift item is shown wherein it is constructed of two halves (101 and 102), sewn together, and with no inflation, it is lying atop the sea floor (103).

Figure 2:
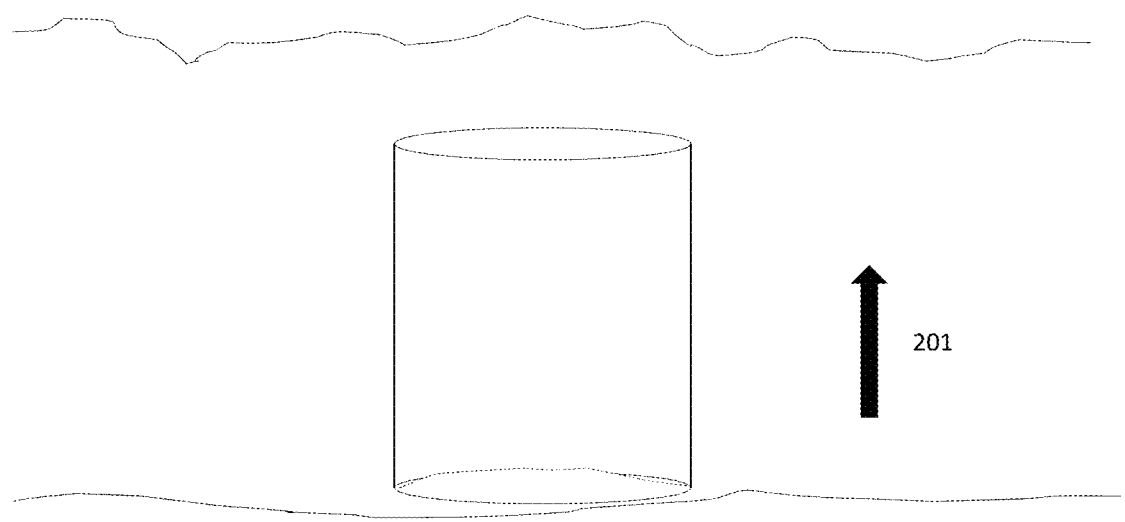
FIG. 2 depicts the item of FIG. 1 partially inflated so as to remain resting on the sea floor while oriented toward the surface.

In FIG. 2, with partial inflation, the item from FIG. 1 is now oriented toward the surface (201). Note, partial inflation may be accomplished by using an attached compressed-gas cylinder with feed-back loop valve control.

Figure 3:
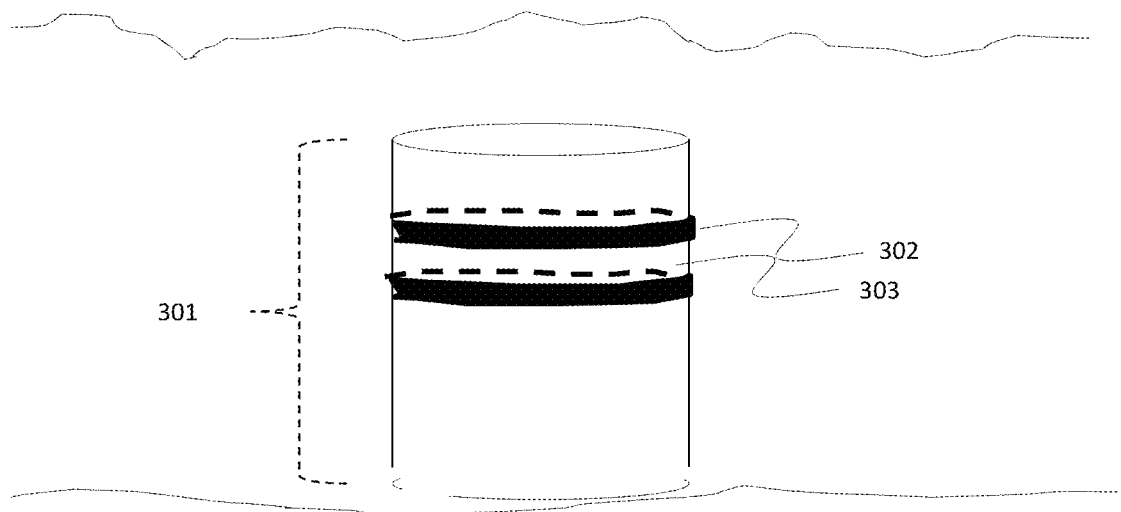
FIG. 3 depicts an exemplary system in which two sonar-signal-reflecting strips are affixed to the lift item such that when partially inflated the strips from essentially horizontally oriented lines separated from one another.

As an exemplary embodiment of the system, in FIG. 3, the item of FIG. 2 (301) has two strips affixed to its halves (302) such that they form parallel bands around the lift item which are parallel to one another and to the sea floor and separated by an inter-band distance (303).

Figure 4:
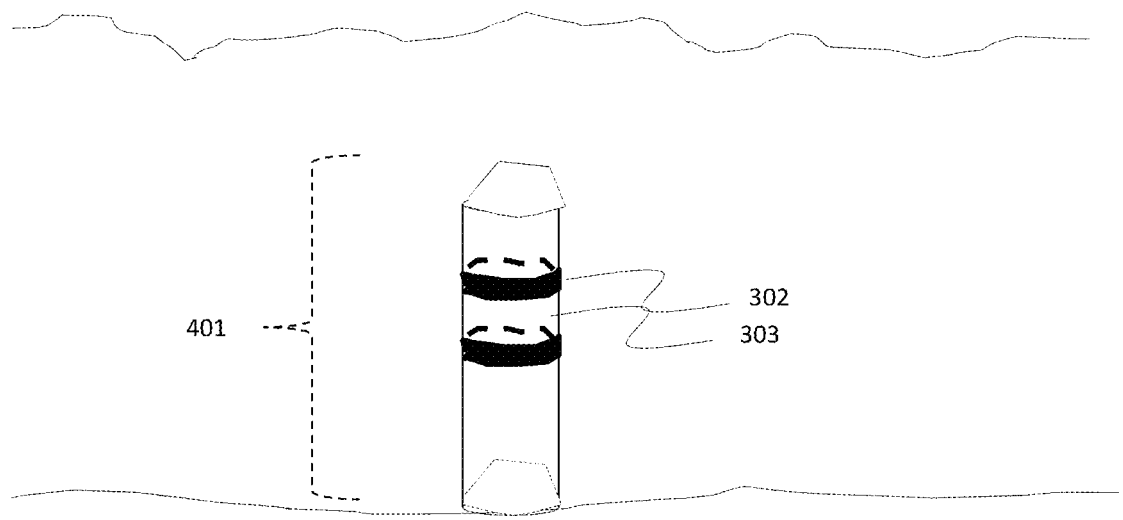
FIG. 4 depicts the item of FIG. 3 in which the view angle has shifted 90 degrees whereas the lines and spacing remain the same.

In FIG. 4, the lift item is now being viewed from an angle 90 degrees from that of the view angle of FIG. 3. The horizontal length of the bands is shorter however, the width and inter-band spacing is the same. Thus, it does not matter from which direction the sonar signal is coming because it will produce essentially the same sonar signature after reflection off the bands.

Figure 5:
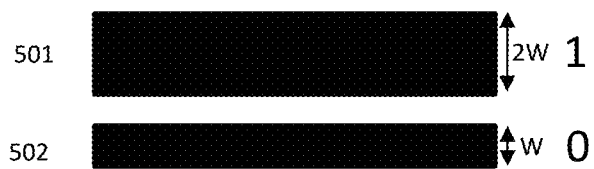
FIG. 5 depicts two distinct strips wherein the widths are different and each is associated with a binary dit, one or zero.

As shown in FIG. 5, the width of the bands can be different such that, for example, two different bands (501 and 502) are used, one (502) having a width, w, and the other (501) having a width, 2w, and each is associated with a binary number, 1 or 0. By using two different widths and binary number associations, one can have far more unique combinations than using a single width of band.

Figure 6:
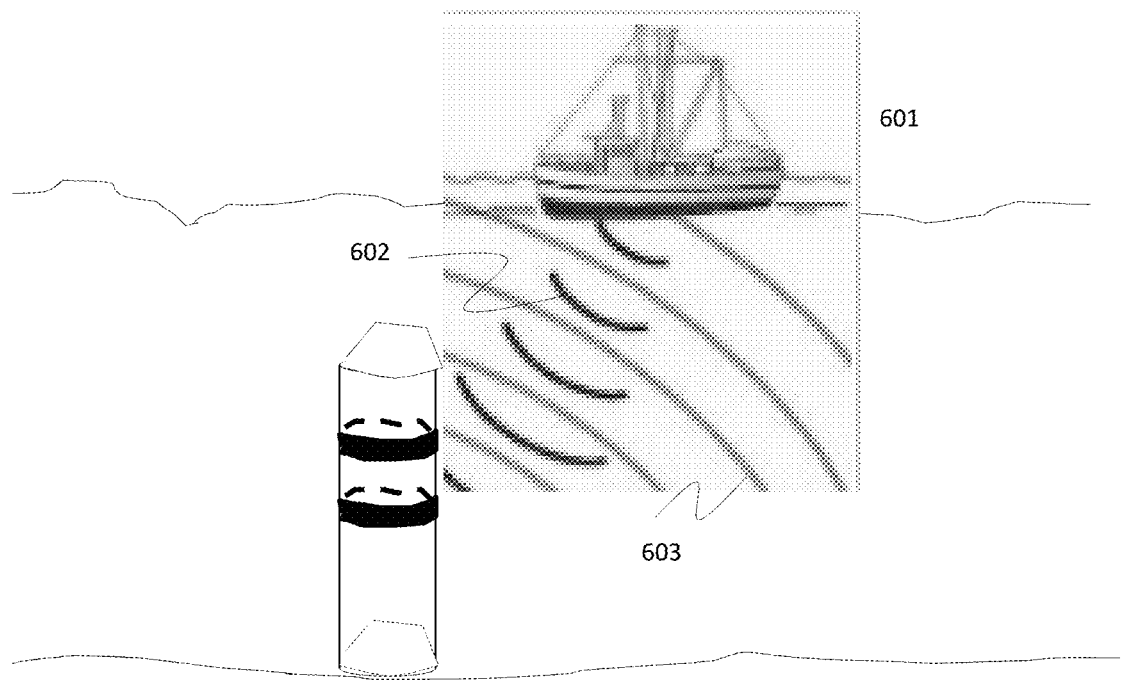
FIG. 6 depicts the item from FIGS. 3 and 4 being pinged by a sonar-equipped vessel wherein the reflected signal will be modulated by the number, widths and sequences of strips on the item, thereby producing a distinct sonar signature.

FIG. 6 depicts the lift item of FIG. 4, partially inflated and oriented toward the surface being pinged by a sonar-equipped vessel (601) wherein an incident signal (601) impinges the lift item and its bands, and a reflected signal (602) is modulated by the number, widths, and sequences of its bands.

The variables that affect signal resolution and distance are: distance between lift item and sonar transducer; width of band; and distance between bands. The variables that affect the number of distinct signatures that can be established are: width of band; distance between bands; and lift-item dimensions. Sea condition can also affect resolution and distance. For example, turbidity may attenuate incident and reflected signals thereby reducing effective operating distances.

Using a typical lift item dimension, one can establish one of 256 different signatures (e.g. eight bands) with a band of 1.0 inch and one of 2.0 inch width and obtain reliable sonar signatures at a distance (horizontal plus depth) of 200 feet, for example. One can adjust band widths, spacing, number and sequences to achieve greater distances.

Other methods of encoding and decoding can be applied, and more than two different band widths can be employed to increase the dynamic range of encoding and decoding.

The sonar-signal-reflecting materials are well-known in the art and provide relatively high reflection coefficients relative to common lift-item materials. Different materials can be used for different bands to create differences in reflectivity that may also be detected as sonar signature variables.

The key novelty of the invention resides in the combination of partial inflation of the lift items to achieve predictable orientation, and the use of bands of sonar-signal-reflecting materials to achieve distinct reflection patterns (e.g. sonar signatures). The materials to be used for the lift items need to be able to expand with gas infusion while remaining water-tight. The sonar-signal-reflecting materials should be affixed to the lift items in such a way that they remain affixed without peeling off, and do not compromise the inflatable characteristics of the lift-item materials, nor compromise the water-tight characteristics of the lift-item material.

Band width is not critical but the value should be chosen based on worst-case distance and reliable sonar signature specifications. Lift-item dimensions are not critical and are determined by worst-case distance and signature dynamic range as these will affect the strip width and inter-band distances. Once chosen, the ratio of band width to one another and to inter-band spacing is fixed.

What is claimed is:

1. A system comprising:
   a lift device;
   said lift device resting on floor of a body of water is partially inflated and pointed essentially toward surface of said body of water;
   said lift device has one or more bands of sonar-signal-reflective material such that when said lift device is pointed essentially toward said surface said one or more bands comprise bands that are essentially horizontal as viewed from a side; and
   said one or more bands, where more than one, are essentially parallel to one another and essentially vertically displaced from one another.

2. A system as in claim 1 further comprising:
   said one or more bands of sonar-signal-reflective material, when impinged upon by an incident sonar signal, will reflect said incident sonar signal as a reflected sonar signal; and
   said reflected sonar signal, compared with said incident sonar signal, will differ in signal characteristics because of said one or more bands of sonar-signal-reflective material.

3. A system as in claim 2 further comprising:
   at least one of said one or more bands has a width, W; and
   at least one of said one or more bands has a width, 2W.

4. A system as in claim 3 further comprising:
   said at least one of said one or more bands with said width W represents a binary 1; and
   said at least one of said one or more bands with said width 2W represents a binary 0.

5. A system as in claim 3 further comprising:
   said at least one of said one or more bands with said width W represents a binary 0; and
   said at least one of said one or more bands with said width 2W represents a binary 1.

6. A claim as in claim 1 further comprising:
   said one or more bands, where more than one, may be made of different materials such that the reflection coefficients of the bands are different.

* * * * *

UNITED STATES PATENT AND TRADEMARK OFFICE
CERTIFICATE OF CORRECTION

| | |
|---|---|
| PATENT NO. | : 11,442,154 B2 |
| APPLICATION NO. | : 17/013590 |
| DATED | : September 13, 2022 |
| INVENTOR(S) | : Richard Preston Riels and Daniel Greenberg |

It is certified that error appears in the above-identified patent and that said Letters Patent is hereby corrected as shown below:

On the Title Page

Item (54), and in the Specification Column 1 Line 1 TITLE should be corrected to read:
PASSIVE SONAR IDENTIFICATION SYSTEM FOR UNDERWATER LIFT BAGS AND FLAGS Signed and Sealed this
Eighth Day of November, 2022

*Katherine Kelly Vidal*

Katherine Kelly Vidal
*Director of the United States Patent and Trademark Office*